(12) United States Patent
Chen et al.

(10) Patent No.: US 7,470,557 B2
(45) Date of Patent: Dec. 30, 2008

(54) SELF-ALIGNED COATING ON RELEASED MEMS

(75) Inventors: Chien-Hua Chen, Corvallis, OR (US); Bradley Charles John, Albany, OR (US); Mike Groh, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 242 days.

(21) Appl. No.: 10/826,288

(22) Filed: Apr. 19, 2004

(65) Prior Publication Data
US 2005/0233596 A1    Oct. 20, 2005

(51) Int. Cl.
*H01L 21/31* (2006.01)

(52) U.S. Cl. ............... 438/52; 438/758; 257/E21.001; 257/E29.324

(58) Field of Classification Search ............ 438/50, 438/52, 758
See application file for complete search history.

(56) References Cited

U.S. PATENT DOCUMENTS

| | | | |
|---|---|---|---|
| 5,116,457 A | | 5/1992 | Jerman |
| 5,235,187 A | * | 8/1993 | Arney et al. ............... 250/306 |
| 6,503,831 B2 | * | 1/2003 | Speakman ................. 438/674 |
| 6,587,408 B1 | * | 7/2003 | Jacobson et al. ......... 369/44.16 |
| 6,592,696 B1 | | 7/2003 | Burdon et al. |
| 6,594,057 B1 | | 7/2003 | Drake et al. |
| 6,617,657 B1 | * | 9/2003 | Yao et al. .................. 257/415 |
| 2003/0160540 A1 | | 8/2003 | Miller et al. |
| 2004/0123651 A1 | * | 7/2004 | Hantschel et al. ........... 73/105 |

* cited by examiner

*Primary Examiner*—Alexander G Ghyka

(57) ABSTRACT

A method of making a semiconductor device including the steps of fabricating at least one component on a substrate and coating the component with a first self-aligned polymer film.

19 Claims, 5 Drawing Sheets

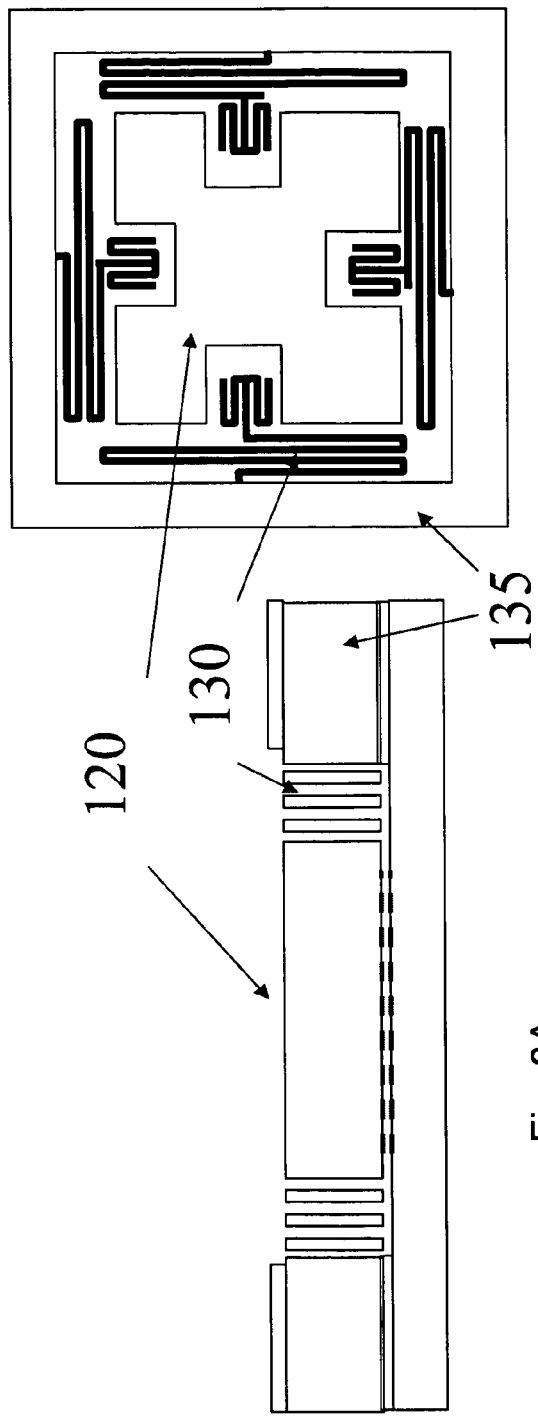
Fig. 3A
Fig. 3B
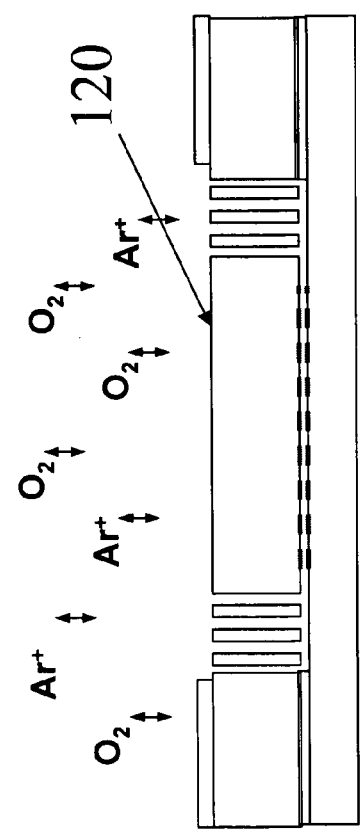
Fig. 6

SELF-ALIGNED COATING ON RELEASED MEMS

BACKGROUND

Memory storage devices are known. Contact atomic resolution storage (CARS) devices have been proposed due to their capability for high memory densities. Thus, they are well suited for mass storage devices. Generally, these devices are microelectromechanical system (MEMS) devices having a release member with a polymer layer for storing data. Typically, the polymer layer is deposited prior to the patterning and fabrication of the release member. To protect the polymer layer from the various processes needed to fabricate the release member, a sacrificial layer is deposited on the polymer layer. This sacrificial layer must be removed prior to assembly of the atomic resolution storage device. However, removal of the sacrificial layer commonly results in damage to the polymer layer.

BRIEF DESCRIPTION OF THE DRAWINGS

FIG. 3A is a cross-section illustrating a method of fabricating an atomic resolution storage device according to an embodiment of the invention.

FIG. 3B is a plan view of the atomic resolution storage device illustrated in FIG. 3A.

FIG. 6 is a cross-section illustrating a step in a method of fabricating an atomic resolution storage device according to an embodiment of the invention.

DETAILED DESCRIPTION OF THE EMBODIMENTS

The present inventors have discovered a method of making semiconductor devices having components with films that does not require the use of a sacrificial layer. The components are first fabricated on the substrate and then a self-aligned film is deposited on the component. Because the method allows media film to be deposited after the flexture release process, it does not require the removal of a sacrificial layer, and thus damage associated with the removal process is not imparted to the film.

Figure 1:
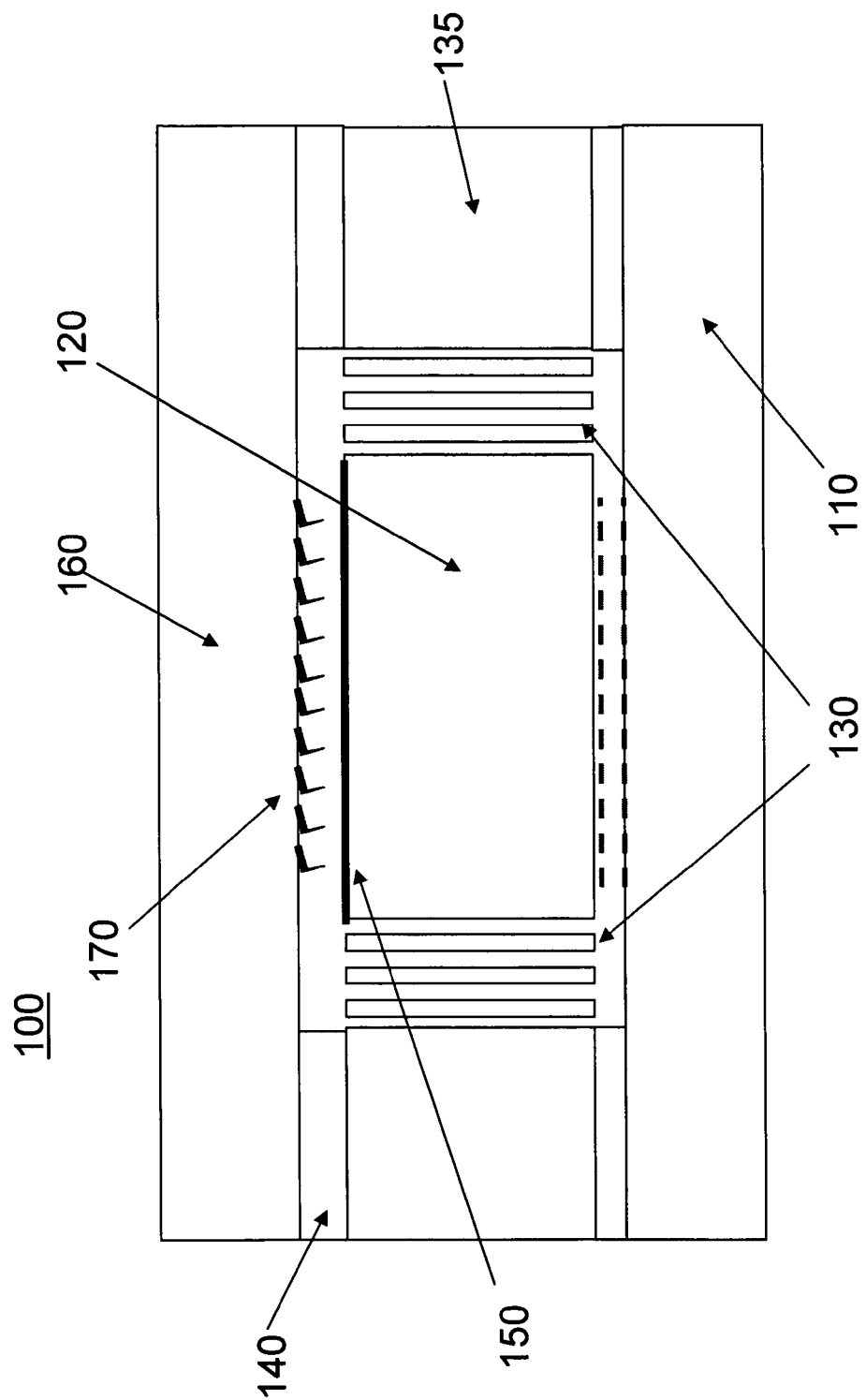
FIG. 1 is a cross-section of an atomic resolution storage device according to an embodiment of the invention.

FIG. 1 illustrates an contact probe atomic resolution storage device 100 according to one embodiment. The contact probe atomic resolution storage device 100 includes a first substrate 110 in which a micromover 120 and a flexure portion 130 have been fabricated. Adjacent to the flexure portion 130 is a stator portion 135. In this embodiment, the flexture portion 130 allows the micromover 120 to move relative to the stator portion 135.

On the top surface of the micromover 120 is a first self-aligned film 150. In this embodiment, the first self-aligned film 150 is adapted to store data. The data is typically stored as indentations in the first self-aligned film 150. The first self-aligned film 150 may be made of either an erasable or a non-volatile material. Erasable materials can be easily rewritten and typically comprise thermoplastic polymers. Example thermoplastic polymers include photoresists and PMMA. However, any material capable of being re-written may be used. Non-volatile materials are typically not erased or re-written and typically comprise thermoset polymers. Epoxy resins and Su-8™, a negative photoresist available from MicroChem Inc. and Sotec Microsystem, are examples of thermoset materials. However, any material capable of retaining data may be used.

On the top surface of the stator portion 135 of the first substrate 110 is a bond ring 140. The bond ring 140 provides a surface to which a second substrate 160 may be affixed. Affixed to the second substrate 160 are contact probes 170. The contact probes 170 are typically attached to cantilevers and adapted to read data stored in the first self-aligned film 150. The contact probes 170 may be AFM tips or any other type of tip suitable for reading nanoscale features.

In another embodiment, the contact probes 170 are adapted to both read and write. For, example, the contact probes 170 may be configured to be heated. If the first film self-aligned 150 is made of a thermoplastic material, the contact probes 170 may be used to erase any existing data. That is, that data may be erased by heating the contact probes 170 to a first temperature high enough to cause the thermoplastic material to reflow, filling in the indentations in the first self-aligned film 150. Once the data is erased, the contact probes 170 can be heated to a second temperature, typically lower than the first temperature, to write new data. That is, the contact probes are heated to a temperature at which the thermoplastic material becomes soft and then the contact probe is pressed into the thermoplastic material to form a new pattern of indentations.

Figure 2:
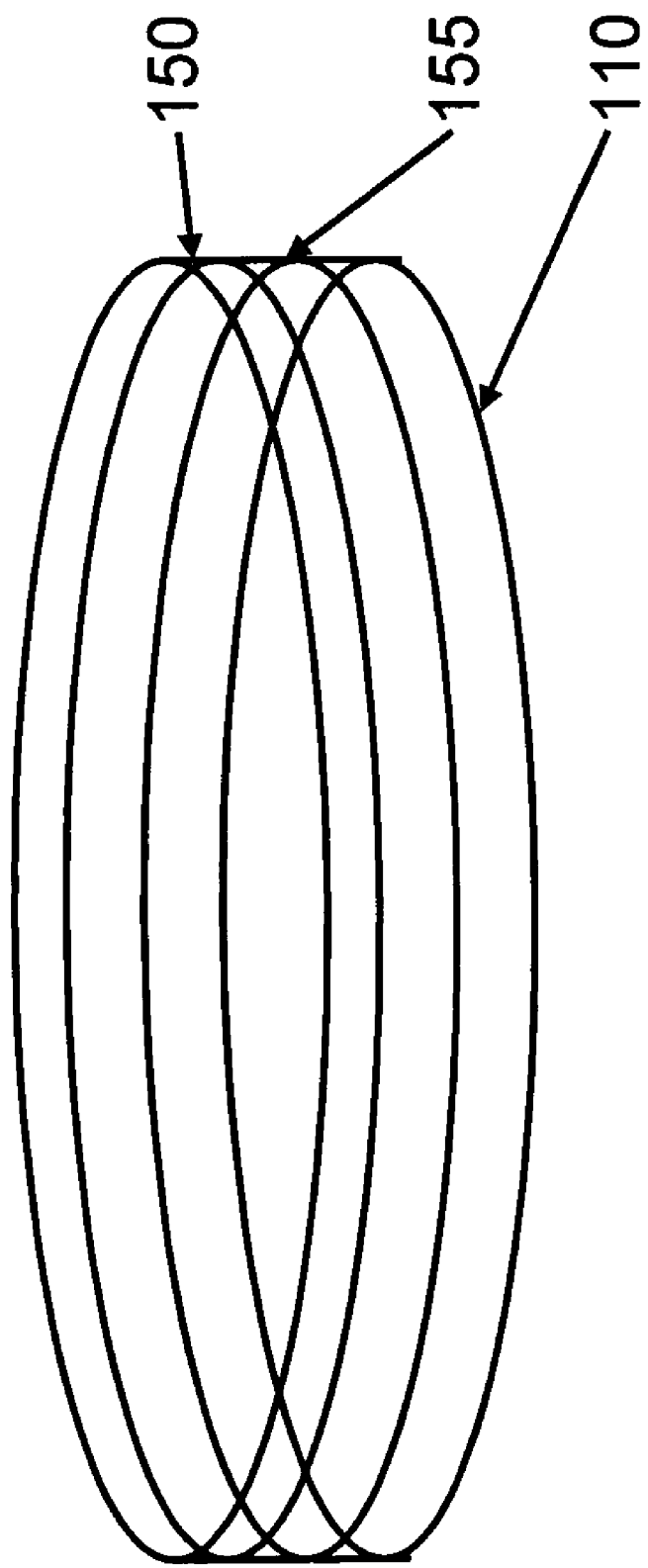
FIG. 2 is a perspective view of a second embodiment of the invention.

FIG. 2 illustrates another embodiment. In this embodiment, a second self-aligned film 155 is provided between the substrate 110 and the first self-aligned film 150. The second self-aligned film 155 may be made of either an erasable or a non-volatile material. However, the second self-aligned film 155 is typically made from a harder material than the first self-aligned film 150 and helps to reduce wear of the contact probes 170. Additionally, the first self-aligned film 150 and the second self-aligned film 155 typically have different glass transition temperatures.

A method of fabricating a semiconductor device and a semiconductor device is illustrated in FIGS. 3A, 3B and 4-7. In particular, FIGS. 3A, 3B and 4-7 illustrate a method of fabricating the contact probe atomic resolution storage device 100 illustrated in FIG. 1. However, the method of this embodiment and the embodiments that follow may be used to fabricate any semiconductor device having at least one component that may be coated with a self-aligned polymer film after patterning and fabricating the component.

Other devices which may be made by the methods discussed below include, but are not limited to, displays, biochips and microelectromechanical system (MEMS) devices. The MEMS devices include surface microelectromechanical system devices, typically having a thickness less than 10 microns and bulk microelectromechanical system devices, typically having a thickness greater than 10 microns. Additionally, the first self-aligned film 150 may be used for purposes other than data storage. For example, the self-aligned film 150 may be used for data storage, antiwear, anti-reflective, desiccant or an anti-stiction.

In this embodiment of the method, a first substrate 110 is provided. The substrate 110 is then processed to fabricate a micromover 120. Additionally, substrate 110 is processed to fabricate flexture portions 130, resulting in "release" of the micromover 120. That is, upon completion of the flexture portions 130, the micromover 120 is capable of moving relative to the stator portions 135. Typically, the micromover 120 and the flexture portions 130 are fabricated by a series of masking, patterning and etching steps. However, any techniques known to one skilled in the art may be used.

Figure 4:
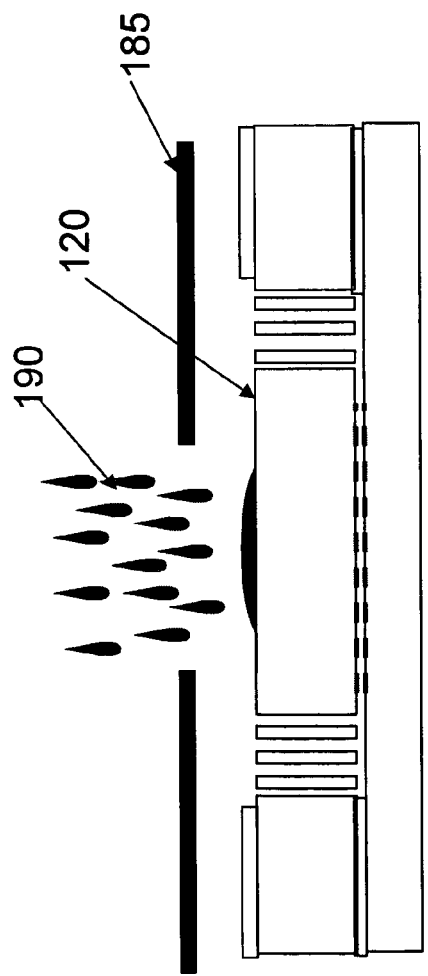
FIG. 4 is a cross-section illustrating a step in a method of fabricating an atomic resolution storage device according to an embodiment of the invention.
Figure 5:
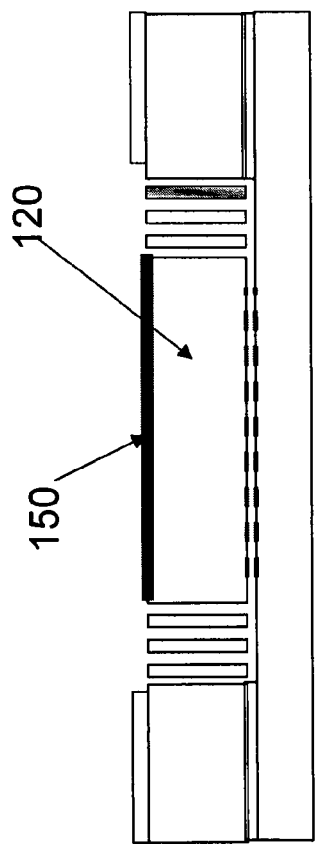
FIG. 5 is a cross-section illustrating a step in a method of fabricating an atomic resolution storage device according to an embodiment of the invention.

After fabrication of the micromover 120 and the flexture portions 130, the first film 150 is formed by depositing a coating composition 190 on the micromover 120 (FIGS. 4 and 5). The coating composition 190 can be directly deposited on the micromover 120 or can be deposited through a shadow mask 185. Further, the coating composition 190 can be selectively deposited on the micromover 120 only or on the entire wafer. For micromovers 120 having a relatively large area, spray coating apparatus which deposit multiple drops of coating composition 190 may be used. For micromovers 120 having a relatively small area, an electronic feed dispenser (EFD) may be used. The EFD typically deposits a single drop at a time, the size of which may be selected very accurately.

The coating composition 190, in one embodiment, is a mixture or suspension of a solvent and solid particles of polymer and spreads across the surface of the micromover due to surface tension. However, the coating composition 190 stops at the edges of the micromover 120 because of the small contact angle at the edge of the micromover 120. That is, because of the small contact angle the coating solution cannot overcome the surface tension at the edge of the micromover 120 and spill over. Thus, the coating composition 190 self-aligns to the shape of the micromover 120. Further, because the coating composition 190 stops at the edges of the micromover 120, there is no stiction problem due to interaction between the first film 150 and the flexure portion 130.

The first film 150 forms as the coating composition 190 cures on the surface of the micromover 120. The thickness of the first film 150 can be controlled by varying the amount of coating composition 190 deposited on the micromover 120 or by varying the solid to solvent ratio. By adding more coating composition 190 of a given composition to a micromover 120 of a given area, the thickness of the first film 150 is increased. Or, for a given volume of coating composition 190, a thicker first film 150 can be formed by increasing the solid content of the coating composition 190.

With the method according to this embodiment, the thickness of the first film 150 may be as thin as approximately 5 nm and as thick as 5 microns. Even thicker films may be produced by depositing a first layer, allowing it to dry, and depositing an additional layer on top of the first layer. This process may be repeated as many times as necessary to form a film of the desired thickness. Further, the additional layers need not be of the same material as the first layer. Typically, the micromover 120 has a coated surface area of between approximately 1 $mm^2$ and 4 $cm^2$. However, the method of the present embodiment may be used to form self-aligned coatings which are smaller than 1 $mm^2$ or greater than 4 $cm^2$. "In another embodiment, the self-aligned film can be applied onto other MEMS devices such as pixel plates in a display device, released sensing structures of a MEMS sensor, AR coating on microlens array, and so on.

FIG. 6 illustrates another embodiment. In this embodiment, the surface of the micromover 120 is plasma treated to improve the wetting of the surface. Plasma treating may be conducted with a plasma generated from argon, oxygen, a mixture of argon and 7 oxygen or any other gas or combination of gases which improve the surface wetting of the surface of the micromover 120.

In still another embodiment, an adhesion promoter is applied to the surface of the micromover prior to depositing the coating composition 190. Example adhesion promoters include, but are not limited to, HMDS and A1100™. Additionally, the adhesion promoter may be used in combination with plasma treating. That is, the adhesion promoter may be deposited after plasma treating.

Figure 7:
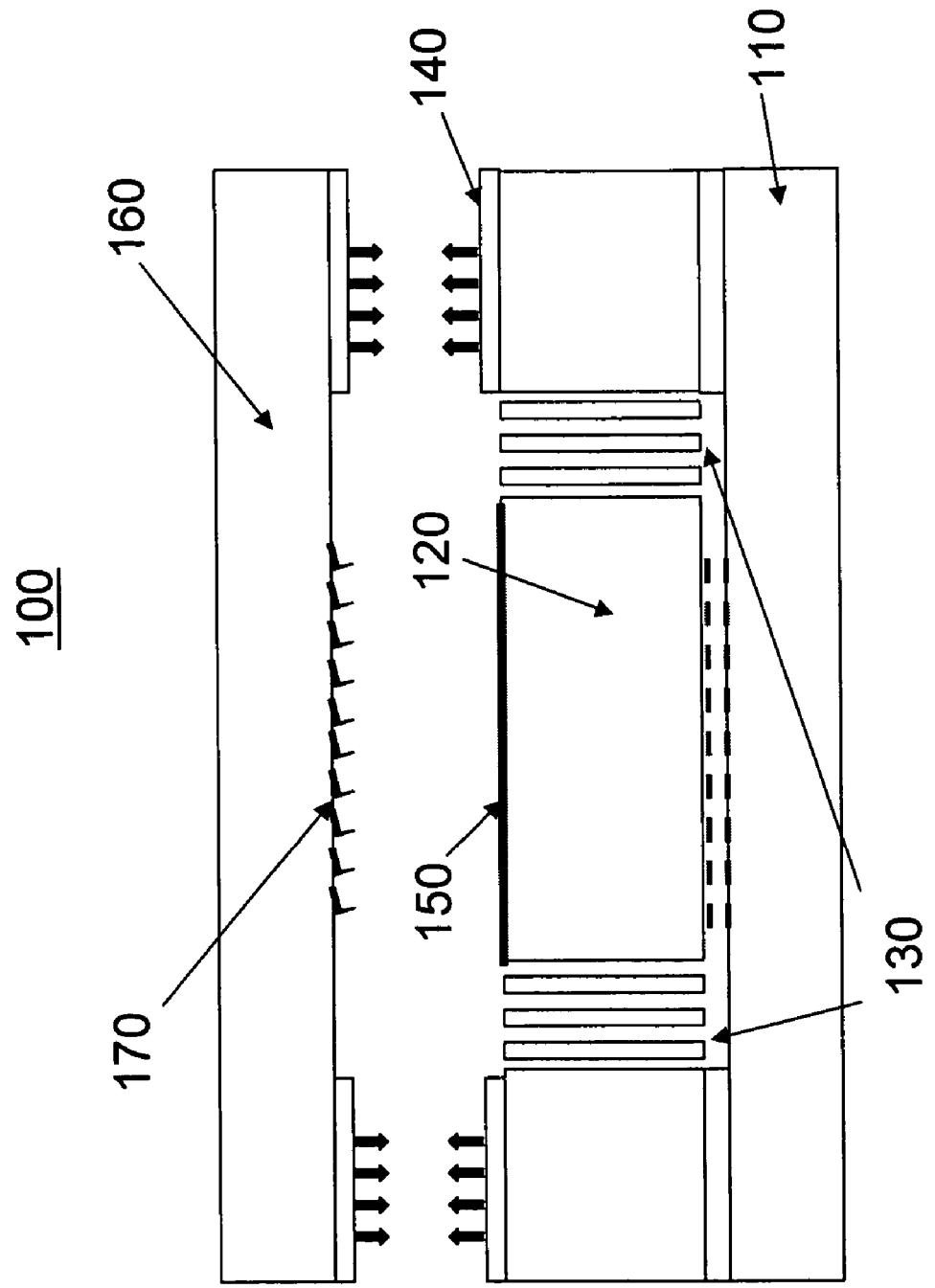
FIG. 7 is a cross-section illustrating a step in a method of fabricating an atomic resolution storage device according to an embodiment of the invention.

FIG. 7 illustrates assembly of the contact probe atomic resolution storage device 100. To complete the contact probe atomic resolution storage device 100, a second substrate 160 having contact probes 170 is affixed to the first substrate 110 via a bond ring 140. In addition to providing a surface for bonding the substrates 110, 160, the bond ring 140 provides a gap in which the contact probes 170 can operate.

The foregoing description of various embodiments has been presented for purposes of illustration and description. It is not intended to be exhaustive or to limit the embodiments to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method of making a microelectromechanical system device comprising:
   releasing a micromover component;
   coating the micromover component with a first film after releasing the micromover component, the first film being configured to store data; and
   affixing contact probes to the device after coating the micromover component, the contact probes being configured to read the stored data.

2. The method of claim 1, wherein the step of coating comprises selectively depositing a coating composition on a surface of the micromover component without going over the edge of the surface by using a difference in surface tension over the edge.

3. The method of claim 1, wherein the film comprises at least one of a polymer, PMMA and an epoxy photoresist.

4. The method of claim 3, wherein the polymer is thermoplastic.

5. The method of claim 3, wherein the first film is configures to store data as indentations on the first film.

6. The method of claim 1, wherein coating the micromover component comprises adjusting a coating parameter to control the film thickness.

7. The method of claim 6, wherein adjusting a coating parameter comprises selecting a solid to solvent ratio.

8. The method of claim 1, wherein at least some of the contact probes is configured to be pressed into the first film to create indentations on the first film after softening of the first film by applying heat to the first film.

9. The method of claim 1, further comprising plasma treating a surface of the micromover component prior to coating.

10. The method of claim 9, further comprising applying an adhesion promoter to the micromover component after plasma treating.

11. The method of claim 1, further comprising coating the micromover component with a second film.

12. The method of claim 11, wherein the second film comprises a different material from the first film.

13. The method of claim 12, wherein one of the films comprises a thermoplastic polymer and the other comprises a thermoset polymer.

14. The method of claim 12, wherein the first film and the second film have different hardness.

15. The method of claim 12, wherein the first film and the second film have different glass transition temperatures.

16. The method of claim 1, further comprising bonding a wafer having at least one contact probe or AFM tip opposite the film, the at least one contact probe and the AFM tip each being one of the contact probes affixed to the device.

17. The method of claim 16, further comprising fabricating a contact atomic resolution storage device.

18. The method of claim 1, wherein the first film is adapted for data storage, anti-wear, anti-reflective, desiccant or an anti-stiction.

19. A method of making a microelectromechanical system device comprising;
   releasing micromover component;
   coating the micromover component with a film after releasing the micromover component; and
   affixing contact probes to the device after coating the micromover component, the contact probes being configured to be pressed into the film to create indentations on the film after softening of the film by applying heat to the film, the indentations on the film being configured to store data.

* * * * *

UNITED STATES PATENT AND TRADEMARK OFFICE
CERTIFICATE OF CORRECTION

PATENT NO. : 7,470,557 B2 Page 1 of 1
APPLICATION NO. : 10/826288
DATED : December 30, 2008
INVENTOR(S) : Chien-Hua Chen et al.

It is certified that error appears in the above-identified patent and that said Letters Patent is hereby corrected as shown below:

On the title page, item (75), in "Inventors", in column 1, line 2, delete "Albany" and insert -- Sheridan --, therefor.

On the title page, item (75), in "Inventors", in column 1, line 3, delete "Mike Groh" and insert -- Michael G. Groh --, therefor.

In column 4, line 38, in Claim 2, after "over" delete "the" and insert -- an --, therefor.

In column 4, lines 45-46, in Claim 5, delete "configures" and insert -- configured --, therefor.

In column 4, line 55, in Claim 8, delete "app1ying" and insert -- applying --, therefor.

In column 6, line 2, in Claim 19, after "comprising" delete ";" and insert -- : --, therefor.

In column 6, line 3, in Claim 19, after "releasing" insert -- a --.

Signed and Sealed this

Twenty-third Day of June, 2009

JOHN DOLL
*Acting Director of the United States Patent and Trademark Office*